Patented May 5, 1953

2,637,720

UNITED STATES PATENT OFFICE 2,637,720

METHOD OF POLYMERIZING ISOBUTYLENE IN THE PRESENCE OF N-BUTENES AND ETHER

Helmuth G. Schneider, Westfield, and Paul W. Brakeley, Jr., Plainfield, N. J., assignors to Standard Oil Development Company, a corporation of Delaware No Drawing. Application September 30, 1949, Serial No. 118,996

1 Claim. (Cl. 260—82)

The present invention relates to an improved method for producing valuable polymers, and more specifically, polymers of isobutylene, which may be used for various purposes. The invention will be fully understood from the following description.

Isobutylene can be polymerized to bodies of high molecular weight at low temperatures of the order of 0° C. to −100° C. For such process it is preferable to use catalysts, and among these, the active halide catalysts, such as boron fluoride and aluminum chloride, or other catalysts may be used, but sulfuric acid and active clay catalysts are also applicable.

The polymers produced in this way are quite different from the well known dimers and trimers of isobutylene and range from very viscous oils to plastic solid or semi-solid rubbery materials which are all freely soluble in hydrocarbon oils. Liquid products may be used alone as lubricating oils or they may be blended with natural oils, while the plastic solid or semi-solid polymers are of the greatest importance in thickening oils and simultaneously in raising their viscosity indices.

It has hitherto been supposed that the most advantageous method of making such polymers was to use isobutylene of the highest possible purity, and it was found that the degree of polymerization, that is to say, as represented by the viscosity or plasticity of the polymer, could be controlled by selection of the proper temperature at which the polymerization is brought about. Thus to make an oil, only moderately low temperatures were required while to produce plastic solid polymers of progressively higher molecular weights, progressively lower temperatures were required.

By the means disclosed above, polymers of various molecular weights and thickening powers can be produced which are suitable for blending agents with lubricating oils and other petroleum products. One advantage of these polymers is that while quite resistant to heat they tend to depolymerize and leave no solid carbonaceous residues. In general, it is found that the heavier, that is, the higher the molecular weight of the product, the more readily it decomposes, and since at the same time the higher molecular weight products have the greatest thickening power, it is particularly desirable to limit the molecular weight range of polymers avoiding excessively high and low polymers, and increasing the yield of fractions whose molecular weights do not greatly differ from the average.

The preparation of polymers from purified feed is necessarily expensive and attempts have been made to use cheaper feed stocks, such as a light cracked petroleum fraction consisting essentially of hydrocarbons having four carbon atoms and containing isobutylene. However, it has been necessary to fortify such a fraction with pure isobutylene in order to obtain polymers of desirable molecular weight, but this is expensive and is not commercially attractive.

It has now been found that the disadvantages of the prior art can be overcome and light cracked C4 fractions can be used as feed stock for the preparation of low molecular weight polymers of isobutylene above 10,000 molecular weight, particularly in the 10,000 to 20,000 molecular weight range by treating the naphtha to remove all or most all of the butene-2. This is predicated on the discovery that all secondary butenes are not alike in their poisoning effect on the polymerization reaction, but that cis and trans butene-2 are far more drastic poisons than butene-1.

According to this invention, therefore, oil cracked for gasoline production is stabilized by rectification and a cut is produced known as the C4 cut. This consists of butanes and butylenes with minor quantities of propane, propylene, pentane and amylene. This cut ordinarily contains from 10 to 20% isobutylene.

This C4 cut is subjected to treatment to remove most of the butene-2 while leaving isobutylene and the lesser poison butene-1. A suitable means for accomplishing this separation is fractionation. However, any other suitable means may be employed, such as extractive distillation, solvent extraction, and isomerization. It may be necessary in some cases to carry out the subsequent polymerization in the presence of a small amount of an activator to increase the molecular weight. In the absence of such activator a small, but economical, amount of isobutylene may have to be added.

A refinery C4 naphtha normally contains an isobutylene:butene-1:butene-2 ratio of approximately 1:1:1, or in terms of tertiary to secondary olefine a ratio of 1:2. All the prior art shows that a polyisobutylene or 10,000–20,000 M. W. cannot be made with such a feed. U. S. Patent No. 2,296,399 teaches that the secondary olefine content must be held substantially below that of isobutylene. This is accomplished by adding pure isobutylene to C4 naphtha. It had not been recognized up to this time that butene-2 is a far greater poison than butene-1. Hence, by removing some of the butene-2 from the feed it is possible to obtain a 10,000–20,000 M. W. product with a feed in which the isobutylene: secondary olefine ratio can be raised to 1:1 and even to have a slight excess of secondary butylene over isobutylene. Under these conditions, the butene-2 content, based on butene-1, should not be over 20%.

When fractionation is employed as the method of removing butene-2, the fractionation is preferably carried out so as to obtain an overhead containing 15 to 30% of isobutylene, 15 to 28% butene-1, and not over 6% of butene-2, the balance being made up of saturated hydrocarbons. By carrying out the fractionation so that 50-80% of the fraction is taken overhead as distillate, no difficulty is encountered in preparing a 10,000-20,000 molecular weight product.

The overhead fraction is then subjected to polymerization at temperatures ranging from 0° C. to —150° C. or lower, in the presence of active halide catalysts, such as boron fluoride and aluminum chloride.

The polymers may be added to lubricating oils and other products, for example, in proportion of .1 to 5% or more and thereby effect a substantial thickening of the oil, or, in other words, increase in viscosity. They also produce at the same time an increase in viscosity index of the oil and are highly desirable for that reason. Stability can best be illustrated by loss in viscosity under severe working conditions: for example, the polymer blend in oil may be circulated through a small orifice under high pressure and the relative decreases in viscosity measure the relative stabilities of the different polymers.

EXAMPLE I

In order to illustrate generally the effect of the addition of pure isobutylene to a C4 naphtha, various mixtures of highly purified isobutylene and C4 naphtha were polymerized at —78° C., using boron fluoride as the catalyst and liquid ethane as the internal refrigerant. About 0.1% diethyl ether was added to increase the molecular weight. The following data were obtained:

Table I

POLYMERIZATION OF C4 NAPHTHA-ISOBUTYLENE MIXTURES WITH BF₃ USING 0.1% DI-ETHYL ETHER AS ACTIVATOR AND ETHANE (INTERNALLY AS REFRIGERANT)

| Feed Composition | | Molecular Weight |
|---|---|---|
| C4 Naphtha | Pure Isobutylene | |
| *Percent* | | |
| 0 | 100 | 92,000 |
| 50 | 50 | 33,620 |
| 60 | 40 | 24,460 |
| 80 | 20 | 11,850 |
| 90 | 10 | 9,550 |
| 100 | 0 | 5,400 |

The above data show that in making a 10-20,000 molecular weight polymer, 30-40% pure isobutylene must be added to C4 naphtha. This means that on total conversion of isobutylene only about 17% of the polymer will be made from the isobutylene in C4 naphtha and the remainder from pure isobutylene. This is not considered a feasible operation.

EXAMPLE II

To show the relative poisoning effects of butene-1 and butene-2 on the quality of the polymer, pure isobutylene containing various amounts of butene-1, and butene-2, were polymerized with boron fluoride using solid carbon dioxide as the internal refrigerant. The following results were obtained:

Table II

POISONING EFFECT OF BUTENE-1 AND BUTENE-2 ON THE POLYMERIZATION OF ISOBUTYLENE BF₃ CATALYST AND CO₂ REFRIGERANT INTERNALLY

| Feed | Molecular Weights | |
|---|---|---|
| Pure Isobutylene | 88,730 | |
| | Butene-1 | Butene-2 |
| Pure Isobutylene+0.001 secondary olefins | | 83,830 |
| Pure Isobutylene+0.01 secondary olefins | 84,600 | 79,000 |
| Pure Isobutylene+0.05 secondary olefins | 81,700 | |
| Pure Isobutylene+0.1 secondary olefins | 78,500 | 73,500 |
| Pure Isobutylene+0.5 secondary olefins | 81,000 | 70,000 |
| Pure Isobutylene+1.0 secondary olefins | 80,500 | 68,000 |
| Pure Isobutylene+2.5 secondary olefins | 78,060 | 54,000 |
| Pure Isobutylene+5.0 secondary olefins | 72,450 | 48,500 |
| Pure Isobutylene+10.0 secondary olefins | 62,850 | 32,000 |

The above data show clearly that butene-2 is a much more severe poison than butene 1.

EXAMPLE III

To show the effect of fractionation of a C4 naphtha on the molecular weight of the polymerized overhead the naphtha was fractionated so as to take overhead from 50-90% of the cut. The original naphtha and each of these cuts were then polymerized with boron fluoride catalyst using solid carbon dioxide as the internal refrigerant both with and without the addition of 0.1% ether as an activator. The data are set forth below:

Table III

C4 NAPHTHA FRACTIONATION—EFFECT OF VOL. PERCENT OVERHEAD ON DISTILLATE COMPOSITION AND POLYMERS PRODUCED WITH BF₃ CATALYST AND CO₂ REFRIGERANT

| Vol. Percent Overhead on Fract. | Composition of Distillate | | | | | Molecular Weights of Polymers Fractionated | |
|---|---|---|---|---|---|---|---|
| | Isobutylene | N-Butane | Isobutane | Butene-1 | Butene-2 | No Ether | With 0.1% Ether as Activator |
| 100% | 14.8 | 28.1 | 26.6 | 12.3 | 17.2 | 5,500 | 7,010 |
| 90% | 16.0 | 28.2 | 18.4 | 14.3 | 7,110 | 11,790 |
| 80% | 17.9 | 23.7 | 33.4 | 16.4 | 6.9 | 8,550 | 15,970 |
| 70% | 20.0 | 22.0 | 36.2 | 17.8 | 4.1 | 9,200 | 15,100 |
| 60% | 21.2 | 11.3 | 42.9 | 18.4 | 1.2 | | 22,360 |
| 50% | 24.6 | 10.7 | 49.9 | 22.7 | 1.0 | 13,720 | 23,090 |

From the above data it is evident that in taking 50–90% of the distillate overhead, no difficulty is encountered in making the desired 10,000–20,000 molecular weight product when the polymerization is activated with ether. If it is not desirable to add ether to the system, then it will be necessary to add small amounts of isobutylene but these are within economical limits as shown by the data below:

*Table IV*

FORTIFICATION OF OVERHEAD C4 CUT WITH PURE ISOBUTYLENE

| Proportion of Distillate | Amount of Pure Isobutylene Added | Molecular Weights | |
|---|---|---|---|
| | | No Ether | With Ether |
| *Percent* | *Percent* | | |
| 90 | 10 | ------ | 20,370 |
| 80 | 10 | 18,700 | 34,240 |
| 70 | 5 | 16,090 | 22,510 |
| | 10 | 17,030 | 44,450 |
| 60 | 5 | ------ | 32,100 |
| | 10 | ------ | 48,400 |
| 50 | 5 | 16,480 | 23,520 |
| | 10 | 17,700 | 34,300 |

From the above data it will be noted that a polymer can be prepared within the desired molecular weight range of 10,000–20,000 without the use of ether by the addition of only 5% pure isobutylene. In this case about 80% of the polymer will be from the isobutylene in the naphtha and only 20% from the pure isobutylene added. This is well within economical limits.

The nature and objects of the present invention having been thus fully set forth and specific examples of the same given, what is claimed as new and useful and desired to be secured by Letters Patent is:

A method for preparing low molecular weight isobutylene polymers having a molecular weight range between 10,000 and 20,000, which comprises fractionating a light cracked petroleum fraction consisting essentially of hydrocarbons having four carbon atoms and containing isobutylene and substantial amounts of butene-1 and butene-2, said petroleum fraction containing about twice as much total n-butenes as isobutylene, separating as a naphtha overhead from said fractionation about 50–90% of the total fraction, said naphtha overhead having a reduced butene-2 content from that of the original petroleum fraction, said naphtha overhead containing an amount of total n-butenes no greater than an amount approximately equal to the amount of isobutylene present, and polymerizing the said resulting separated naphtha overhead with boron fluoride at a temperature below 0° C. in the presence of about 0.1% of ether.

HELMUTH G. SCHNEIDER.
PAUL W. BRAKELEY, Jr.

References Cited in the file of this patent

UNITED STATES PATENTS

| Number | Name | Date |
|---|---|---|
| 2,219,867 | Gay | Oct. 29, 1940 |
| 2,296,399 | Otto | Sept. 22, 1942 |
| 2,384,916 | Holmes | Sept. 18, 1945 |